United States Patent
Blevins et al.

(10) Patent No.: US 6,445,962 B1
(45) Date of Patent: Sep. 3, 2002

(54) AUTO-TUNING IN A DISTRIBUTED PROCESS CONTROL ENVIRONMENT

(75) Inventors: Terrence L. Blevins; Dennis L. Stevenson; Wilhelm K. Wojsznis, all of Round Rock, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/268,219

(22) Filed: Mar. 15, 1999

(51) Int. Cl.[7] .............................................. G05B 13/02
(52) U.S. Cl. ............................ 700/37; 700/42; 700/48; 700/50
(58) Field of Search ............................... 700/37, 40–43, 700/47, 48, 50

(56) References Cited

U.S. PATENT DOCUMENTS

| | | | |
|---|---|---|---|
| 4,549,123 A | 10/1985 | Hägglund et al. | 318/610 |
| 4,602,326 A | 7/1986 | Kraus | 364/160 |
| 4,903,192 A * | 2/1990 | Saito et al. | 364/157 |
| 5,283,729 A | 2/1994 | Lloyd | 364/157 |
| 5,295,061 A * | 3/1994 | Katayama et al. | 364/157 |
| 5,311,421 A * | 5/1994 | Nomura et al. | 364/157 |
| 5,748,467 A | 5/1998 | Qin et al. | 364/148 |
| 5,768,119 A | 6/1998 | Havekost et al. | 364/133 |
| 5,801,942 A | 9/1998 | Nixon et al. | 364/188 |
| 5,828,851 A | 10/1998 | Nixon et al. | 395/285 |
| 5,838,563 A | 11/1998 | Dove et al. | 364/188 |
| 5,847,952 A * | 12/1998 | Samad | 364/148 |
| 6,128,541 A * | 10/2000 | Junk | 700/39 |
| 6,330,484 B1 * | 12/2001 | Qin | 700/50 |

FOREIGN PATENT DOCUMENTS

| WO | WO 99/19778 | 4/1999 |
|---|---|---|

OTHER PUBLICATIONS

Great Britian Search Report for GB 0005630.9 (corresponding to U.S. Ser. No. 09/268,219) dated Jul. 5, 2000.

DeltaV™ System Overview Brochure, Fisher–Rosemount Systems, 32 pages (1998).

DeltaV™ Product Data Sheets, DeltaV Control Network, Workstation Specifications, DeltaV Controller, DeltaV Power Supplies, DeltaV I/O Subsystem, DeltaV Diagnostics, DeltaV Event Chronicle, DeltaV Excel Add–in, DeltaV Real–Time Data Server, 56 pages (1996).

(List continued on next page.)

Primary Examiner—Paul P. Gordon
(74) Attorney, Agent, or Firm—Marshall, Gerstein & Borun

(57) ABSTRACT

An auto-tuner for use in tuning a control element in a process control network having distributed control functions includes a first tuning element located in the field device in which the control element is operating and a second tuning element located in a different device that communicates with the first device via a communication network. The first tuning element controls the operation of the control element during the dynamic data capture phase of an auto-tuning procedure, collects data during this phase of the auto-tuning procedure and determines one or more process characteristics from the collected data. The first tuning element then communicates the determined process characteristics to the second tuning element via the communication network. The second tuning element uses a stored rule set to determine a new tuning parameter for the control element based on the process characteristics developed by the first tuning element and sends the determined tuning parameter via the communication network to the control element to thereby re-tune the control element.

29 Claims, 5 Drawing Sheets

OTHER PUBLICATIONS

U.S. patent application No. 08/105,899, "Method and Apparatus for Fuzzy Logic Control with Automatic Tuning," filed Aug. 11, 1993.

U.S. patent application No. 09/070,090, "System and Method for Automatically Tuning a Process Controller," filed May 28, 1993.

U.S. patent application No. 09/151,084, "A Shadow Function Block Interface for Use in a Process Control Network," filed Sep. 10, 1998.

Ott et al., "Auto–Tuning From Ziegler–Nichols to Model Based Rules," *Fisher–Rosemount Systems,* Inc., 10 pages (Date unknown).

Intelligent Field Devices—Role Changes, FRSI/RMD/MP/TLB, 7 pages (1997).

Configuring CL6010, CL6210, and CL7010 Series Interactive and Computing Controllers, *Fisher Controls* (1985).

User Manual for Types ACS401 DEC OpenVMS VAX Intelligent Tuner and ACS411 DEC OpenVMS AXP Intelligent Tuner Software, *Fisher Rosemount Systems, Inc.* (1997).

CE4.2:CL6211 Manual, *Fisher–Rosemount Systems, Inc.,* p. 3–22 to 3–26 (1990).

CE10.0:CL6633:vol.2 Manual, *Fisher–Rosemount Systems, Inc.,* p. Glossary–17 (1994).

\* cited by examiner

AUTO-TUNING IN A DISTRIBUTED PROCESS CONTROL ENVIRONMENT

FIELD OF THE INVENTION

The present invention relates generally to process control networks and, more specifically, to a device and method for performing auto-tuning on control elements distributed throughout a process control environment.

DESCRIPTION OF THE RELATED ART

Process control networks, such as those used in chemical, petroleum or other processes, have generally included a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. Generally speaking, the process controller receives signals indicative of measurements made by one or more field devices and/or other information pertaining to the field devices, uses this information to implement a typically complex control routine and then generates control signals which are sent via the analog signal buses to the field devices to thereby control the operation of the process.

Recently, there has been a move within the process control industry to implement field-based digital communications within the process control environment. For example, the process control industry has developed a number of standard, open, digital or combined digital and analog communication protocols such as the HART®, PROFIBUS®, WORLDFIP®, Device-Net® and CAN protocols. These digital communication protocols generally enable more field devices to be connected to a particular bus, support more and faster communication between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network.

Also, there is now a move within the process control industry to decentralize process control and, thereby, simplify process controllers. Decentralized control is obtained by having field mounted process control devices, such as valve positioners, transmitters, etc. perform one or more process control functions using what are typically referred to as function blocks or control blocks and by then communicating data across a bus structure for use by other process control devices (or function blocks) in performing other control functions. To implement these control functions, each process control device typically includes a microprocessor having the capability to implement one or more function blocks as well as the ability to communicate with other process control devices using a standard and open communication protocol. In this manner, field devices can be interconnected within a process control network to communicate with one another and to perform one or more process control functions forming a control loop without the intervention of a centralized process controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and to communicate with one another via a standard bus to effect decentralized control within a process.

Tuning of any control block or control loop in a prior art system that has the entire process control routine (e.g., all of the function blocks of the control routine) or parts thereof located within one or more centralized controllers is fairly simple. because the entire tuning routine can also be stored in the centralized controller. When tuning of a control loop of such a centralized control routine is desired, the separate tuning routine within the centralized controller forces the appropriate control block, such as a proportional-integral (PI) or proportional-integral-derivative (PID) control block, through a tuning procedure like an induced oscillation procedure, to determine predefined characteristics of the process or the loop. During this dynamic data capture phase of the tuning procedure, the tuning routine collects data generated by the loop, which is being delivered to the centralized controller per normal operation, and determines from this data one or more process characteristics, such as the ultimate gain, the time constant, etc. of the process. Once the desired process characteristics are calculated, the tuning routine applies a set of rules or other algorithms using the calculated process characteristics to determine new tuning parameters for the control block or control loop. This step is commonly referred to as the rule application phase of the tuning procedure. Thereafter, the tuning routine delivers the new tuning parameters to the control block (or control loop) and the tuning procedure is complete. Because, in a centralized process control system, all of the control functions are located within the controller and all of the data necessary for tuning is provided to the controller during normal operation of the process, the tuning routine has direct access to the control blocks and to the data necessary for performing the tuning routine.

With decentralized communication protocols in which control blocks or control elements, such as PI, PID, fuzzy logic, etc. control blocks, are located in a distributed manner throughout a process control network, it is harder to tune the control blocks (or control loops within which these blocks are operating) because the control blocks are located away from the centralized controller (or other device) where the tuning routine is typically stored. In one known prior art system used for implementing tuning in a distributed process control environment, the entire tuning procedure remains within the centralized process controller. This system, however, cannot perform fast tuning because it must communicate over a bus network (which is providing other communications within the process) to receive the data developed during the tuning routine and, unfortunately, the amount of data (or speed at which the tuning routine can receive this data) is limited by the constraints of the bus throughput. Furthermore, because the bus communications are controlled by a separate bus controller and not by the tuning routine, the tuning routine cannot strictly control the exact times at which the tuning control signals are delivered to the control block in order to start, stop and implement different segments of the tuning procedure. This, in turn, means that the tuning control routine does not have strict control over the timing of the tuning procedure, which may lead to inaccurate results.

In another known prior art system that provides tuning within a distributed process control environment, the entire tuning routine is placed within the same device as the control block to be tuned (such as the PID function block) and, in fact, is actually incorporated into the functionality of the control block. While this system is able to control the timing of the tuning procedure precisely and to collect data at any desired rate (because the tuning routine does not have to communicate with the control block via a bus), the tuning routine must be compiled along with and at the same time as the control block, which increases the overhead (e.g., the timing, processing, memory, etc. requirements) associated with the use of the control block during normal operation of the process, even though the functionality of the auto-tuning routine is used relatively infrequently during normal operation of the control loop. Furthermore, a complete auto-tuning routine must be placed within each different device in which a control block is located in order to enable auto-tuning of each control block, which adds unneeded redundancy to and increases the cost of the process control system.

SUMMARY OF THE INVENTION

An auto-tuner for use in tuning a control element (such as a control block) in a process control network having distributed control functions includes a first tuning element located within a controller or a field device in which the control element is operating and a second tuning element located in a different device, such as an operator workstation, a personal computer or a centralized controller connected to the controller or the field device in which the first tuning element is located, wherein the second tuning element communicates with the first tuning element via a bus or other communication network. The first tuning element controls the operation of the control block during the dynamic data capture phase of an auto-tuning procedure, collects data during this phase of the auto-tuning procedure and, preferably, calculates one or more process (e.g. loop) characteristics from the collected data. The first tuning element sends the calculated process characteristics (or the collected data) via the communication network to the second tuning element of the auto-tuner. The second tuning element uses one or more stored sets of rules (such as a fuzzy logic rule set, a neural network configuration or rule set or any other set of algorithms) to determine new tuning parameters for the control element based on the process characteristics developed by the first tuning element. The second tuning element may then send the new tuning parameters via the communication network to the control element to re-tune the control element or the control loop within which the control element is located.

An embodiment of the auto-tuner described herein is able to control the timing of the tuning procedure in a precise manner and to capture as much data as necessary to determine desired process characteristics because the control and data capture functions are performed within the same device as the control element and, as a result, there is no need to communicate with the control element via a bus during the dynamic data capture phase of the tuning procedure. However, this auto-tuner does not result in unnecessary overhead within the control element because the tuning parameter calculations are performed in another device located away from the control element and, as a result, the control element does not need to be compiled to incorporate these functions. Furthermore, a single tuning parameter calculation routine can be used to calculate tuning parameters for different types and different ones of the control elements within the network because this routine can store and use different sets of rules for each of the different types of control elements being tuned. Moreover, the same auto-tuner function block or functionality can be placed within each of the devices having a control element therein because the process characteristics associated with different control loops can be determined in the same manner, even if these control loops use different types of control blocks including, for example, PI, PID) and fuzzy logic control blocks. These advantages make the auto-tuner more versatile and eliminates the need to place separate complete auto-tuners in each device having a control element therein. Still further, this auto-tuner can be easily implemented into any part of a process control network as an add-on capability.

DESCRIPTION OF THE PREFERRED EMBODIMENTS

Figure 1:
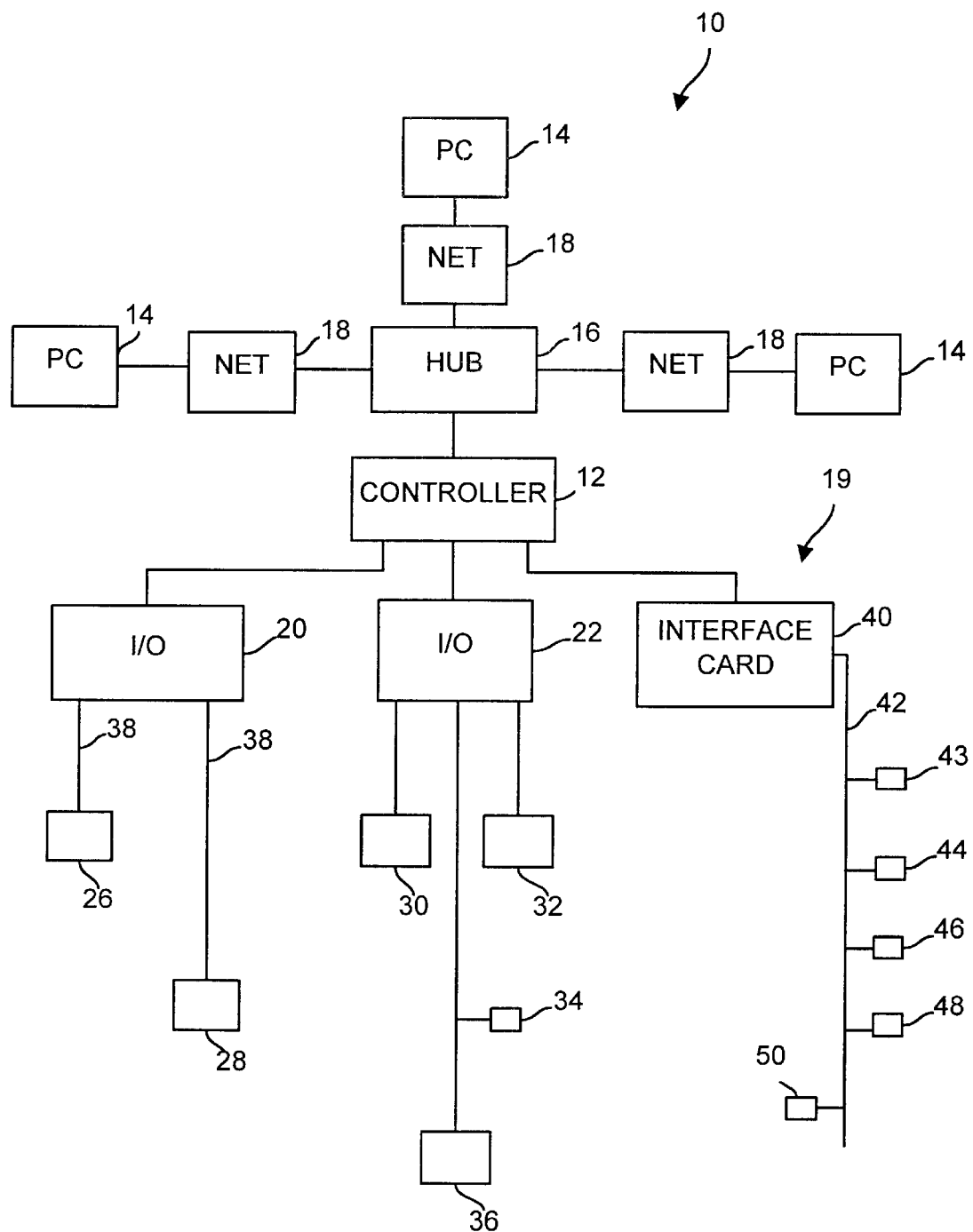
FIG. 1 is a schematic block diagram of a process control network having distributed control elements which use an auto-tuner.

Referring now to FIG. 1, a process control network 10 is illustrated in block diagram form. The process control network 10 includes one or more centralized process controllers 12 (only one of which is shown in FIG. 1) capable of implementing a process control routine stored therein and/or capable of communicating with control elements, such as function blocks, located within field devices distributed throughout the process control network 10. The controller 12 may be, by way of example only, the DeltaV™ controller sold by Fisher-Rosemont Systems and may be connected to numerous workstations such as personal computers (PCs) 14 via a hub 16 and ethernet connections 18. In this configuration, the PCs 14 may be used by one or more operators or users to communicate with the process controller 12 or the field devices to thereby obtain information pertaining to elements of the process control network 10, to review or change the status of elements within the process control network 10, to obtain information pertaining to individual field devices within the process control network 10, etc. If the controller 12 is a DeltaV controller, it may provide a graphical depiction of the process control routine within the controller 12 to the user via one of the PCs 14 illustrating the function blocks or other control elements within the process control routine and the manner in which these function blocks are linked together to provide control of the process. Furthermore, if desired, a user or operator may be able to initiate tuning of one or more of the function blocks or control loops from one of the PCs 14.

As illustrated in FIG. 1, the centralized controller 12 is connected to numerous field devices located throughout a process (indicated generally by reference number 19). The centralized controller 12 may communicate through any standard types of I/O cards 20 and 22 to typical field devices 26, 28, 30, 32, 34 and 36 which are subject to centralized control from the controller 12. The I/O card 20 may be, for example, an analog I/O card that connects the controller 12 to analog field devices 26 and 28 which communicate over 4 to 20 mA buses 38. Likewise, the I/O card 22 may be a digital or combined digital and analog I/O card that communicates with digital or mixed digital and analog field devices using, for example, the 4 to 20 mA analog format or any other desired format. Of course, the field devices 26, 28, 30, 32, 34 and 36 may be any types of field devices including transmitters, sensors, valve positioners, valve controllers, etc. As will be understood for the example process control network 10 illustrated in FIG. 1, the field devices 26–36 are associated with portions of the process 19 subject to centralized control by a control routine stored within the controller 12.

The controller 12 is also communicatively connected to an interface card 40 which, in turn, is connected to (or is part of) a process control network in which process control is performed in a distributed manner. In the embodiment illustrated in FIG. 1, the decentralized process control portion of the process 19 includes the interface card 40, a bus 42 and numerous field devices 43, 44, 46, 48 and 50 connected to the bus 42. The device 43 may be, by way of example, a transmitter that measures some process variable while the device 44 may be a positioner/valve device that controls the flow of a fluid within the process. The distributed process control network of FIG. 1 may be, for example, a Fieldbus network which uses the Fieldbus communication protocol and the interface card 40 may be a link active scheduler associated with the Fieldbus communication protocol.

The centralized process control routine located within the controller 12 receives inputs from the field devices 26–36 and potentially 43–50, performs calculations and other activities associated with the control routine and then sends commands to the field devices via the I/O cards 20 and 22 and the interface card 40 to implement any desired control of the process 19. It should be noted, however, that the decentralized process control portion of the process control network 10 (i.e., that associated with the bus 42 in FIG. 1) may implement its own process control routine in a decentralized manner in conjunction with (or instead of) the control being performed by the controller 12. Thus, while the controller 12 may interface with and perform some control over the devices 43–50 connected to the bus 42, these devices may also implement control functions or function blocks that are not associated with control performed by the controller 12 but that are, instead, distributed throughout the devices connected to the bus 42. In any case, the auto-tuner of the present invention may be used to tune any control element (such as a function block) located in any of the field devices 26–36 and 43–50 or the controller 12 of FIG. 1.

While, in the preferred embodiment, the decentralized portion of the process control network 10 uses the Fieldbus communication and control protocol, it could use any other known or desired protocol as well, including protocols developed in the future. Generally speaking, the Fieldbus protocol is an all-digital, serial, two-way communication protocol that provides a standardized physical interface to a two-wire loop or bus interconnecting "field" equipment such as sensors, actuators, device controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of the centralized process controller 12 or eliminates the need of the centralized processor 12 for those field devices or areas of the process.

It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein.

Figure 2:
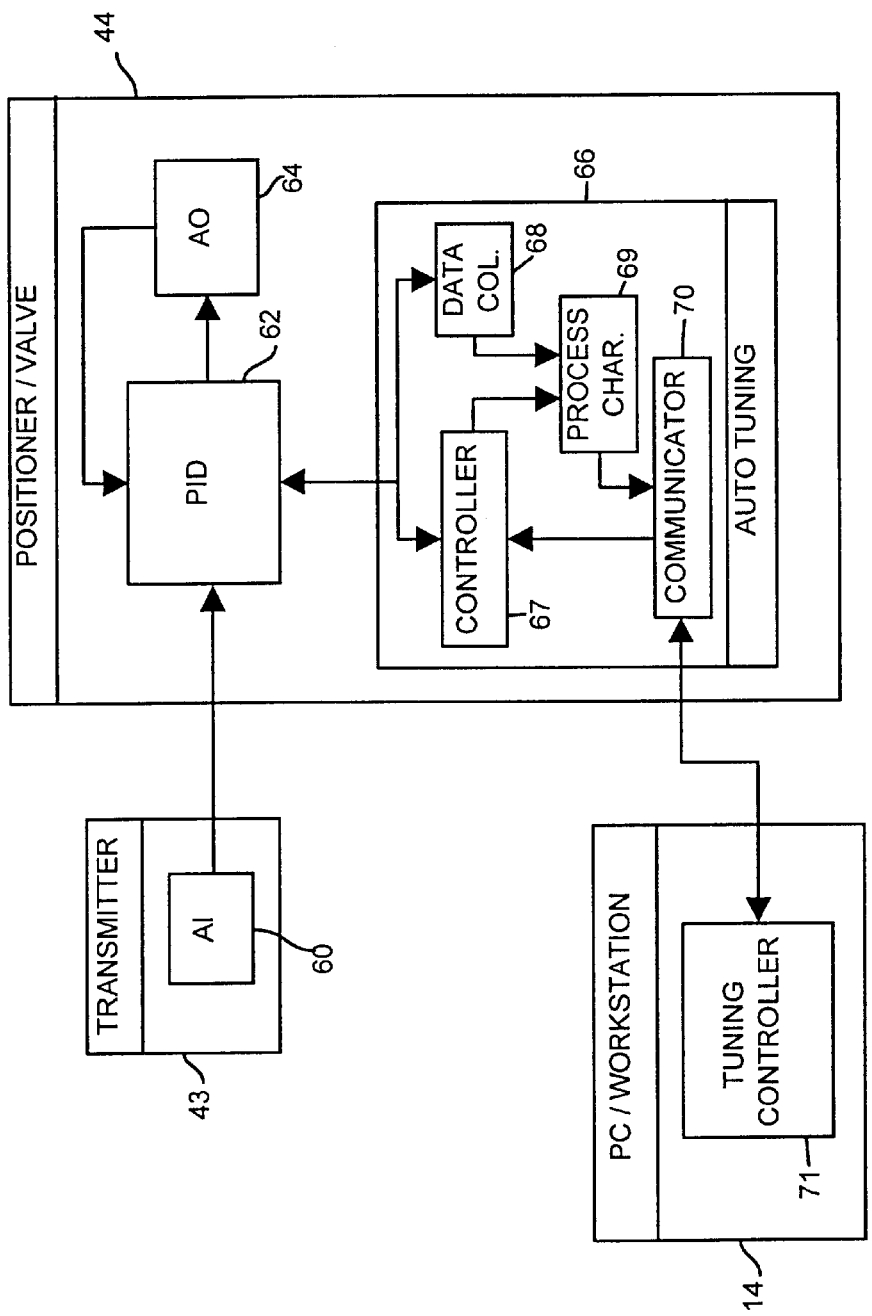
FIG. 2 is a schematic block diagram of an embodiment of an auto-tuner used in a control loop within a distributed process control environment.

FIG. 2 depicts a schematic block diagram of interconnected function blocks making up a control loop that may be implemented within, for example, a Fieldbus network or any other distributed control environment in which the function blocks within a control loop are located in different devices interconnected by a communication network such as a bus. The control loop illustrated in FIG. 2 includes an analog input (AI) function block 60 (which may be, for example, located in the transmitter 43 of FIG. 1), a PID function block 62 and an analog output (AO) function block 64. For the example loop of FIG. 2, the PID function block 62 and the AO function block 64 are located in the positioner/valve 44 of FIG. 1. The communication connections between the function blocks 60, 62 and 64 are illustrated in FIG. 2 by lines attaching the process and control inputs and outputs of these functions blocks. Thus, the output of the AI function block 60, which may. comprise a process variable measurement or process parameter signal, is communicatively coupled via the Fieldbus wire 42 to the input of the PID function block 62 which, in turn, has an output comprising a control signal communicatively coupled to an input of the AO function block 64. An output of the AO function block 64, which comprises a feedback signal indicating, for example, the position of the valve 44, is connected to a control input of the PID function block 62. The PID function block 62 uses this feedback signal along with the process measurement signal from the AI function block 60 (and potentially other signals or set points) to perform any desired control of the AO function block 64 to thereby control the process variable measured by the AI function block 60. The connections indicated by the lines in the control loop diagram of FIG. 2 may be performed internally within a field device when, as in the case of the AO and the PID function blocks 64 and 62, the function blocks are within the same field device.

An auto-tuner for use in tuning the control element 62 includes an auto-tuning function block 66 located within the positioner/valve 44. The auto-tuning function block 66 is communicatively coupled to and controls the PID function block 62 during operation of the dynamic data capture phase of a tuning procedure by sending signals to the inputs thereof, changing an output, etc. In particular, during the dynamic data capture phase of the tuning procedure, a control element controller 67 (which may be, for example, a signal generator implemented in either hardware or software) drives the control loop comprising the function blocks 60, 62 and 64 into a controlled induced oscillation procedure (or drives the control loop to implement any other desired tuning procedure). A data collection unit 68 collects data generated by or delivered to the PID function block 62 (or any other portion of the loop) during this procedure and, preferably, stores this data in a memory of the device 44. A process characteristic determining unit 69 may then determine any desired process characteristics, which may be any process, loop or device characteristics, from the collected data using any known or desired procedure. Thereafter, a communication unit 70 provides the calculated process characteristics (or the data necessary for determining such characteristics) to a tuning controller 71 which, preferably, is located in one of the operator workstations or PCs 14 but may be located in the centralized controller 12, etc. apart from the device 44 in which the auto-tuning function block 66 is located.

During the tuning procedure, the auto-tuning function block 66 forces the process loop to undergo certain changes and senses various quantities or signals existing within the process control loop to determine one or more process characteristics of the process or control loop. These process characteristics (or the data captured during the tuning procedure) are delivered to a tuning controller 71, which is located in a different device, for use in user interface support and in developing one or more sets of control or tuning parameters. It will be understood that the use of the PID function block 62 is merely exemplary and the auto-tuning function block 66 could be used with any other type of function block in any other control loop. Furthermore, the tuning controller 71 can be located in any other device including, for example, a user or operator interface device (such as any workstation), any controller, or even another field device.

It will be understood that the individual elements of the auto-tuning function block 66 can be implemented in any desired manner. For example, in the preferred embodiment, each of these elements is implemented in software run on the processor associated with device in which the auto-tuning function block 66 is stored. In this case, the control element controller 67 may be a series of instructions to be used in communicating with and controlling the inputs to and the outputs of the PID function block 62 or other function block being tuned. Likewise, the data collection unit 68 may monitor certain desired signals associated with, for example, the PID function block 62 and store data indicative of these signals in a memory of the device 44. The process characteristic determining unit 69 may be implemented in software to calculate or otherwise determine one or more process characteristics from the stored or collected data and the communication unit 70 may communicate with the tuning controller 71 using the communication protocol or setup of the device 44. For example, in a Fieldbus device, the communication unit 70 may cause the communication system already provided within the device 44 to communicate the process characteristics over the Fieldbus bus 42 to the tuning controller 71. In the Fieldbus environment, the individual units 67, 68, 69 and 70 may be packaged together as a stand-alone Fieldbus function block or may be provided within the PID function block 62. Alternatively, any or all of the units 67, 68, 69 and/or 70 could be implemented in software, hardware or firmware in any other process control environment.

The auto-tuning function block 66 and, more particularly, the control element controller 67, may use any desired tuning procedure such as any open-loop or closed-loop technique during the tuning procedure. Likewise, the auto-tuning function block 67 may measure any desired variables including, for example, the output of the AO function block 64, the set point of the PID function block 62, the output of the AI function block 60, etc. to determine the desired process or loop characteristics. In a preferred embodiment, the auto-tuning function block 66 is configured to use a controlled induced oscillation procedure to determine the desired process characteristics. In such a configuration, the controller 67 of the auto-tuning function block 66 applies to a control input of the PID function block 62 a square wave signal having a selectable peak-to-peak value of $2d$ centered about the value of the control signal delivered to the PID function block 62 before induced oscillation was initiated. In response to such a square wave signal, the control loop of FIG. 2 undergoes induced oscillation and the output of the AI function block 60 (i.e., the process variable) oscillates having a peak-to-peak amplitude $2a$ and a period $T_u$. From the amplitude $a$ of the process variable and the amplitude of the square wave signal, the ultimate gain $K_u$ of the process can be derived according to the equation:

$$K_u = \frac{4d}{\pi a} \qquad (1)$$

and the ultimate period $T_u$ of the process can be calculated as being equal to the period of oscillation of the process variable. The auto-tuning function block 66 may, of course, measure other data and determine other desired process characteristics including, for example, the time delay $T_d$ and the dominant time constant of the process.

After calculating such process characteristics, the auto-tuning function block 66 provides these characteristics to the tuning controller 71 which determines, from the quantities $K_u$ and $T_u$, a preliminary set of control or tuning parameters including, for example, the proportional gain $K_p$, the integral time constant $T_i$ and the derivative time constant $T_d$ of the PID control function block 62. If desired however, the auto-tuning function block 66 may capture the necessary data, store that data and provide the stored data to the tuning controller 71 via a bus in non-real time, in which case, the tuning controller 71 may calculate the desired process or loop characteristics in any desired manner.

Notwithstanding the above discussion, it will be understood that the auto-tuning function block 66 may implement any desired dynamic data capture routine including any of the numerous routines which are known for control loops having PI, PID, fuzzy logic or other types of control elements therein. For example, the auto-tuning function block 66 may implement a controlled induced oscillation procedure, such as a Hägglund-Åström relay tuning procedure described in U.S. Pat. No. 4,549,123, the disclosure of which is hereby expressly incorporated by reference herein. In the relay type tuning method, the auto-tuning function block 66 brings the process loop (made up of the function blocks 60, 62 and 64) into self-oscillation using, for example, a non-linear feedback function and measures the response of the process loop to determine desired process characteristics, such as the ultimate gain and the ultimate period.

Alternatively, the auto-tunning function block 66 may incorporate the design of any one of the tuners described in U.S. Pat. No. 6,330,484 entitled "Method and Apparatus for Fuzzy Logic Control with Automatic Tuning," issued Dec. 11, 2001, the disclosure of which is expressly incorporated by reference herein. For example, the auto-tuning function block 66 (in particular, the process characteristic calculator 69) may perform a model matching tuning procedure in which signature analysis is performed on a process variable to select, from a plurality of stored mathematical models, the model that most accurately characterizes the process or loop. The process characteristics of the process loop are then determined from the selected model.

Still further, the auto-tunning function block 66 may determine the process characteristics of the loop using a pattern-recognition method of process characterization, such as that disclosed in U.S. Pat. No. 4,602,326, the disclosure of which is hereby expressly incorporated by reference herein. In the pattern recognition method of tuning, the characteristics of the process or loop are determined by observing a process variable as it responds to a process upset condition. The pattern of the process variable produced as a result of the process upset condition is then analyzed to determine the desired characteristics of the process or loop.

Still further, the auto-tuning function block 66 may use any signal injection method of determining the characteristics of a process (e.g., a loop) such as for example, those disclosed in U.S. Pat. Nos. 5,283,729 and 5,453,925 entitled "System and Method for Automatically Tuning a Process Controller," issued Sep. 26, 1995, the disclosure of each of which is expressly incorporated by reference herein. However, any other tuning procedure may be used, as desired, and the auto-tuning controller 66 is not limited to use with the specific tuning procedures described or referred to herein.

Likewise, the tuning controller 71 may use any desired method of determining tuning parameters from the process or loop characteristics (or raw data) calculated by or collected by the auto-tuning function block 66. For example, the tuning controller 71 may use any of the tuning parameter calculations methods described or referred to in U.S. Pat. No. 5,748,467, the disclosure of which is hereby expressly incorporated by reference herein, including, for example, internal model control (IMC) tuning, Cohen and Coon tuning, Ziegler-Nichols tuning, or modified Ziegler-Nichols tuning, to name a few.

In general, the tuning controller 71 stores one or more sets of rules (e.g., such as a fuzzy logic rule set, a neural network configuration or rule set, or any set of linear or non-linear algorithms) which it uses to determine tuning parameters, such as the gain and time constant, according to the type of function block being tuned. Still further, the tuning controller 71 (which may communicate with any number of different auto-tuning function blocks in different devices) may store different sets of tuning parameter calculation rules for different types of control blocks or loops and, thus, may be used to tune any or all of PID, PI, fuzzy logic or other control elements within a process control system. Because the tuning controller 71 can store many different sets of rules to be used with different types of control elements and can apply whatever set of rules is appropriate when calculating the new tuning parameters based on the dynamic process characteristics determined by the auto-tuning function block 66, only a single tuning controller 71 needs to be located in any process control network.

After the tuning controller 71 determines the new tuning parameters, it provides these parameters to the appropriate control element, such as the PID function block 62 of FIG. 2 via the bus 42. If desired, the tuning controller 71 may provide the tuning parameters to the auto-tuning function block 66 which may then provide these parameters to the PID function block 62.

Using the separated function setup described above, wherein the functions performed during the dynamic data capture phase of tuning are separated from the functions performed during the rule application phase of tuning, the auto-tuner is able to control the timing of the operation of the control loop in a very precise manner during the dynamic data capture phase of the tuning procedure. Still further, this auto-tuner is able to detect and store as much data as necessary to accurately determine the process characteristics of the control loop being tuned because data communications are not occurring in real time over a bus. Also, because the rule applying functions associated with determining new tuning parameters based on process or loop characteristics (which can be quite involved) are not performed in the device or by the function block used to control the loop, these functions do not need to be coded into the operating loop. This, in turn, reduces the overhead of the loop as compared with systems in which the entire tuning routine is located within the control block being tuned.

Figure 3:
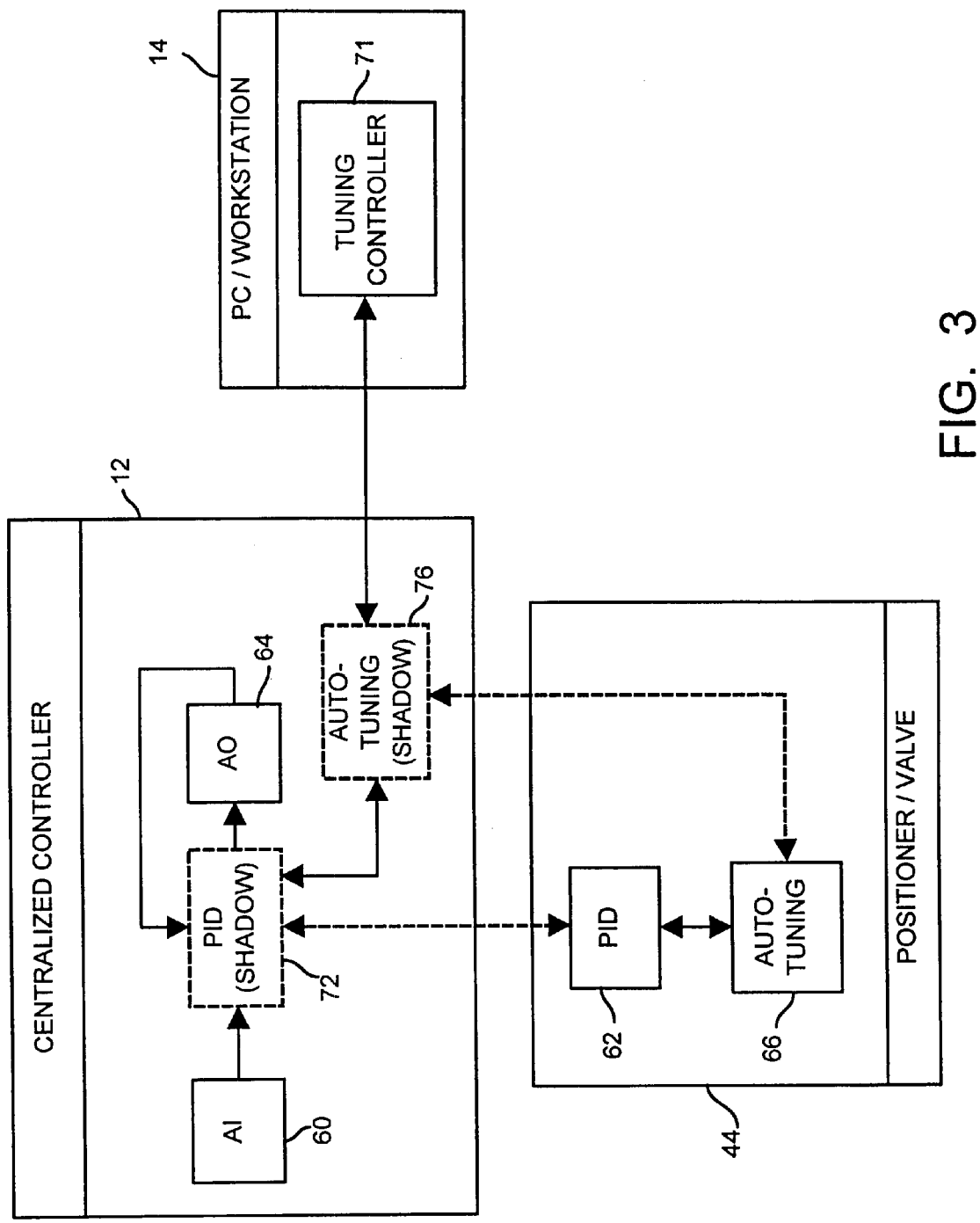
FIG. 3 is a schematic block diagram of a further embodiment of an auto-tuner used in a control loop within a process control environment having both distributed and centralized control elements.

Referring now to FIG. 3, a further embodiment of the auto-tuner of the present invention is illustrated for use in an environment having control blocks or control functions implemented in both a centralized and a decentralized manner. In this example, the AI function block 60 and the AO function block 64 are located within and are run by the centralized controller 12 of FIG. 1 which communicates with a transmitter device and a valve/positioner device (which may be any of the devices 26, 28, 30, 32, 34 or 36 of FIG. 1) to obtain the inputs and outputs of these function blocks. However, the PID function block 62 is stored in and is implemented by the positioner/valve device 44 in the decentralized Fieldbus network of FIG. 1 and communicates with the centralized controller 12 via the Fieldbus link 42 and interface card 40 of FIG. 1.

In this embodiment, the centralized controller 12 includes a shadow PID function block 72 (indicated by a dashed block) which mirrors the inputs and outputs and other data associated with the PID function block 62 and which communicates with the AI and AO function blocks 60 and 64 as if the PID function block 62 was stored in and implemented by the centralized controller 12. More particularly, when the shadow PID function block 72 receives inputs via links from the AI and AO function blocks 60 and 64, it immediately sends these inputs to the actual PID function block 62 within the positioner/valve 44. The communications between the shadow PID function block 72 and the actual PID function block 62, indicated by a dashed line in FIG. 3, are performed using the communication protocol associated with the field device 44, in this case the Fieldbus protocol. The actual PID function block 62 then performs its control functions based on the received inputs in a standard manner, as if the AO and AI function blocks 60 and 64 were Fieldbus function blocks within the Fieldbus network.

Likewise, the shadow PID function block 72 is configured to receive periodic updates of the outputs and other data indicative of the state of the actual PID function block 62 and to communicate such data via links within the controller 12 to the AI and AO function blocks 60 and 64 at appropriate times. In this manner, it appears to the AI and AO function blocks 60 and 64 that the PID control function is provided within the centralized controller 12. These blocks can communicate with the shadow PID function block 72 in the same manner that these blocks communicate with any other function block executed by the centralized controller 12. The details concerning the implementation of a shadow function block are not the subject of the present invention but are described in detail in U.S. patent application Ser. No. 09/151,084 entitled "A Shadow Function Block Interface For Use in a Process Control Network," filed Sep. 10, 1998 (pending) which is assigned to the assignee of the present invention, the disclosure of which is hereby expressly incorporated by reference herein.

In the embodiment of FIG. 3, the auto-tuning function block 66 is located within the positioner/valve 44 and communicates with and controls the actual PID function block 62, as described with respect to FIG. 2, to implement a tuning procedure. Similar to the PID function block 62, the auto-tuning function block 66 has a shadow auto-tuning function block 76 located within the controller 12. The actual auto-tuning function block 66 communicates with the shadow auto-tuning function block 76 and sends data (such as calculated process or loop characteristics) to the shadow auto-tuning function block 76 and receives commands or other data from the shadow auto-tuning function block 76. As with the embodiment of FIG. 2, the tuning controller 71 of the auto-tuner is stored within and implemented by the workstation or PC 14 but could, instead, be within the controller 12 or any other desired device. The tuning controller 71 communicates with the shadow auto-tuning function block 76 to, for example, initiate a tuning procedure, to receive process or loop characteristics developed by the auto-tuning function block 66 or to receive data collected by or indicative of the state of the auto-tuning function block 66.

When tuning is desired in the embodiment of FIG. 3, the tuning controller 71 receives a command (e.g., from a user or a further controller within the process control network) to initiate tuning. The tuning controller 71 then sends a tuning initiation command to the shadow auto-tuning function block 76 which sends this command to the actual auto-tuning function block 66. In response to this command, the actual auto-tuning function block 66 begins a tuning procedure, such as any of those described above with respect to the embodiment of FIG. 2, collects data generated by the loop during the tuning procedure and then calculates or otherwise determines one or more desired process characteristics. The actual auto-tuning function block 66 then provides these characteristics (or the collected data) to the shadow auto-tuning function block 76 which communicates this information to the tuning controller 71.

Alternatively, the shadow auto-tuning function block 76 or the tuning controller 71 may change the state of the shadow PID function block 72 (which changes the state of the actual PID function block 62) forcing the actual PID function block 62 to call or otherwise communicate with the actual auto-tuning function block 66 to thereby implement the tuning procedure. In this case, the shadow auto-tuning function block 76 may be initiated or installed automatically upon the change of state of the PID function block 62.

In either case, the tuning controller 71 determines new tuning parameters based on the received data (such as the calculated loop or process characteristics) using any desired tuning parameter calculation method. The tuning controller 71 then sends such tuning parameters to the shadow PID function block 72 (or any other function block as needed) and the shadow PID function block 72 sends these new tuning parameters to the actual PID function block 62 where they are used by the PID function block 62 during normal operation of the loop.

It will be understood that, while desirable, the use of the shadow auto-tuning function block 76 is not necessary and, instead, the tuning controller 71 could communicate directly with the auto-tuning function block 66 to implement a tuning procedure. Furthermore, while the embodiments of FIGS. 2 and 3 illustrate the auto-tuning function block 66 as a separate function block from the PID function block 62, the functionality of the auto-tuning function block 66 could, instead, be incorporated into the PID (or other control) function block 62 instead of being a separate function block.

Preferably, the auto-tuning shadow function block 76 has attributes that are identical to those of the auto-tuning function block 66 of the Fieldbus device. In one embodiment, however, the standard Fieldbus attributes of STRATEGY, ALERT_KEY, MODE_BLK and BLOCK_ERR need not be provided in the shadow auto-tuning function block 76, although they are provided in the actual auto-tuning function block 66. Also, the auto-tuning shadow function block 76 need not be directly visible to the user because it is used by the tuning controller 71 only during the identification phase (i.e., the dynamic data capture phase) of the tuning procedure to initiate control and to provide communication between the tuning controller 71 and the auto-tuning function block 66. None-the-less, the parameters of the auto-tuning shadow function block 76 are available to and are used by the tuning controller 71 and by the tuning user interface application and can be obtained by a user application if so desired. Still further, the Fieldbus PID function block 62 is preferably modified to include the starting index of the auto-tuner function block 66, which index is also available for use by the shadow auto-tuning function block 76. This enables the PID function block 62 to be controlled by the auto-tuning function block 66.

Process characteristic information may be included in, for example, a Fieldbus auto-tuning function block 66, as well as the shadow auto-tuning function block 76, as attributes in the same manner as other attributes associated with any other type of Fieldbus function block. Those skilled in the art will know that different attributes can be provided in the actual auto-tuning function block 66, as well as the shadow auto-tuning function block 76, depending on the different type of tuning being used and the different aspects of the system in which the auto-tuner is located. Some example process characteristics or information that can be provided by an auto-tuning function block are defined below as:

T_IPGAIN—Integrating Process Gain—The rate of change in a process output for a unit step change in the input;

T_UGAIN—Ultimate Gain—The value of the proportional only controller gain at which a loop is marginally stable, that is, on the borderline between stability and instability;

T_UPERIOD—Ultimate Period—The period of oscillation of a loop when its controller gain is set to the ultimate gain of the process;

T_PSGAIN—Process Static Gain—The ratio of process output change to process input change;

T_PTIMEC—Process Time Constant—The time duration between when a system starts to respond to a step input and when it reaches 63 percent of its final, steady-state value; and T_PDTIME—Process Delay Time—The length of time between when a control action is taken and when the process starts to respond to this action.

These attributes are calculated in the auto-tuning function block 66 when a tuning test is complete and are then submitted to the tuning controller 71 in, for example, the workstation 14, which uses one or more of these process characteristic information or attributes to determine tuning parameters, such as gain, integral time (the inverse of reset) and derivative time (rate) for, e.g., a PI or PID or fuzzy logic controller. In one embodiment, the above-listed attributes may be floating point data, be stored in non-volatile memory as static data, and may be accessed as read only data. Also, each of the above listed attributes may be made available in view 1 and 3 of the Fieldbus or the DeltaV protocol. It will be understood that the view list in the Fieldbus or the DeltaV protocol defines the parameters that will be provided by a single request (i.e. a view) for information from the function block. Thus, using a view request, the shadow auto-tuning function block 66 may obtain the most recent values for a large number of the attributes available from the auto-tuning function block 66.

Furthermore, it will be understood that the attributes or process characteristics listed above are associated with one possible implementation of an auto-tuner and that there are other attributes and information that can be provided by other auto-tuners configured in other ways to operate according to the present invention. Such other process characteristic information may include any desired types of gains, such as ultimate gain, static gain and integral gain, times, such as the ultimate period, the dead time and the derivative time, and any time constants associated with the process, as well as other desired information.

It will also be understood that the exact type of auto-tuning implemented is not important to the invention and the list provided above is merely an example of some types of process characteristic information that may be made available to the tuning controller 71 to enable the tuning controller 71 to determine one or more tuning parameters. If desired, the tuning controller 71 may use any type of PID, fuzzy logic, neural network, etc. process to determine tuning parameters, such as controller gain, reset, rate, etc. from inputs such as ultimate gain, ultimate period and dead time.

In a preferred embodiment, the auto-tuning application (i.e., the tuning controller 71) writes to a TUNSKI attribute of the shadow PID function block 72 to indicate that the auto-tuning is to be performed on the associated function block within the Fieldbus device (i.e., the actual PID function block 62.) In response to this attribute change, an instance of the shadow auto-tuning block 76 is created in the centralized controller 12. (Incidentally, the tuning controller 71 also writes to the TUNSKI attribute to indicate when auto-tuning is complete, which causes the shadow auto-tuning function block 76 to be discarded.) After the shadow auto-tuning function block 76 is created, the state of the associated auto-tuning function block 66 in the Fieldbus device is read. If the state of the auto-tuning function block 66 is clear (T_Request=0) then tuning may proceed. However, if the T_Request attribute is not 0, then tuning is active within the Fieldbus device. In this case, the tuning request is not honored and the instance of the shadow auto-tuning function block 76 is deleted to thereby stop auto-tuning.

When an instance of the shadow auto-tuning function block 76 is created, its static and dynamic attributes reflect those of the auto-tuning function block 66. These values will be accessed by the auto-tuning application (i.e., the tuning controller 71) as though a PID function block in the centralized controller 12 were being tuned. Thus, if the auto-tuning application 71 writes a new value to an attribute of the shadow auto-tuning function block 76, the shadow auto-tuning function block 76 initiates a write of this attribute value to the associated auto-tuning function block 66. Likewise, when the auto-tuning function block 66 is actively working within a Fieldbus device, the shadow auto-tuning function block 76 periodically gets the dynamic attribute values (view 3 in the Fieldbus protocol) of the auto-tuning function block 66. Because the auto-tuning function block 66 is defined as a function block, this view will be accessed in the same manner as in other blocks. The dynamic attribute values provided in response to the view request are then used in the shadow block 76 to update its dynamic attribute values. When the Fieldbus interface card 40 (of FIG. 1) sees a change in a static attribute value, it requests all of the static attributes (view 4) from the auto-tuning function block 66. The static values received in response to this request are then used to update the attributes of the shadow auto-tuning function block 76.

Furthermore, when a device within a device library associated with the centralized controller 12 contains a PID function block, this template information may include one static attribute associated with the PID function block that defines the object dictionary index for the start of the auto-tuning function block associated therewith within the device, such as within the positioner/valve 44 of FIG. 3. Generally speaking, only one auto-tuning function block needs to exist in a device that contains one or more PID (and/or other control) blocks. However, the auto-tuning function block 66 will not, preferably, be defined as a block in the device template and thus, will not be shown in the library. None-the-less, when the shadow auto-tuning function block 76 is created by the centralized controller 12, the index of the auto-tuning function block 66 will be used by the shadow auto-tuning block 76. Based on this index, a proxy will be established in the Fieldbus interface card 40 for the auto-tuning function block 66. In this manner, the auto-tuning attributes in the remote (e.g., Fieldbus) device will only be accessed when the auto-tuner application is activated and the associated PID function block 62 has been selected for tuning. If the PID function block 62 is running in the remote device, then the PID function block reference to the auto-tuning function block in that device will be known. If the PID function block is running in the centralized controller 12, then the auto-tuning block will be instantiated by the PID block at the start of auto-tuning.

Figure 4:
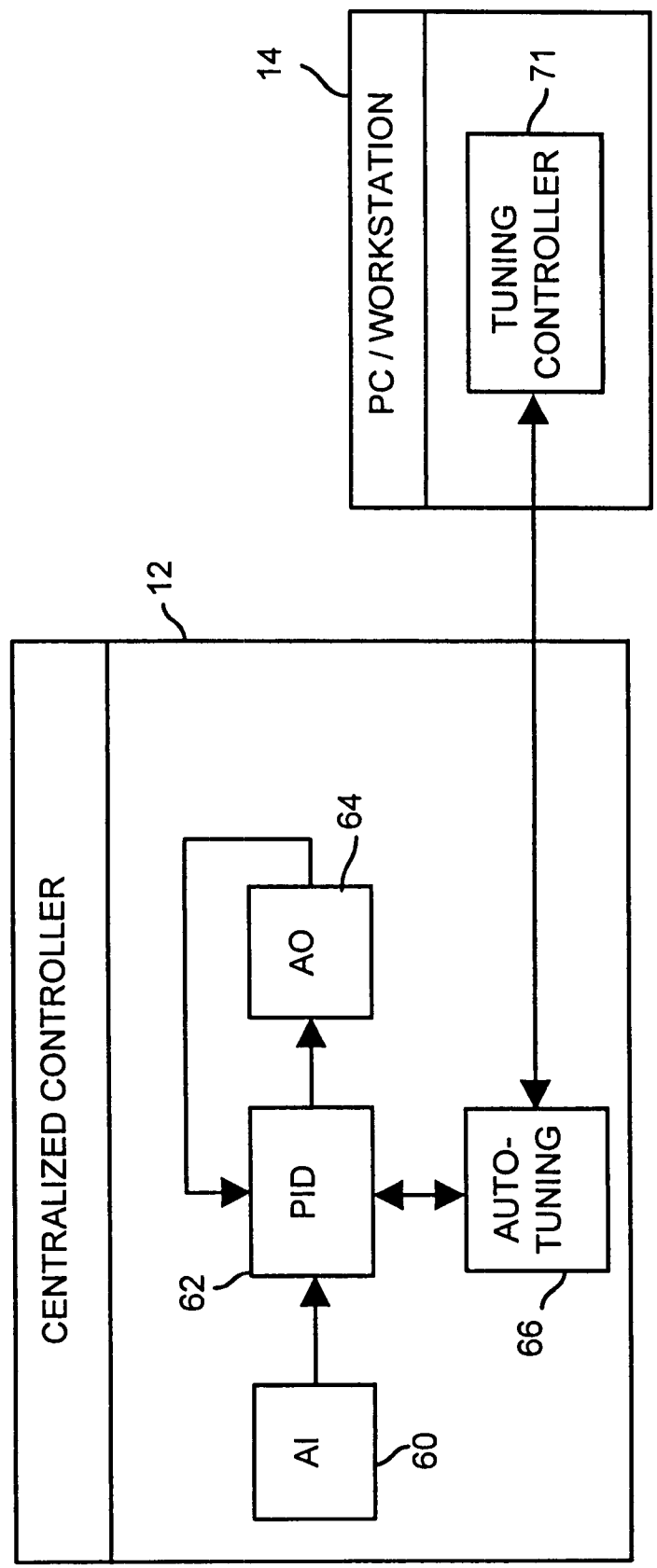
FIG. 4 is a schematic block diagram of a still further embodiment of an auto-tuner used in a control loop within a process control environment having centralized control elements.

Referring now to FIG. 4, another embodiment illustrates the case in which the actual auto tuning function block 66 is located in the controller 12 and is used to tune a PID function block 62 also located within the controller 12. This configuration may be used when, for example, it is desired to tune a control block that controls a non-smart device or any other device, the operation of which is controlled by control function blocks executed by the centralized controller 12. It will be understood that the tuning controller 71 operates in the same manner as in the embodiment of FIG. 3 except that the tuning controller 71 communicates directly with the actual auto-tuning function block 66 which, in turn, communicates with the actual PID function block 62, both of which are stored in the controller 12.

In the preferred embodiment, the auto-tuning function block 66 is provided as a modifier function block within the remote (e.g., Fieldbus) device or within the controller 12. Generally speaking, a modifier function block is a function block that modifies the algorithm of an original or base function block (such as the PID function block 62) without being a part of the original or base function block.

Figure 5:
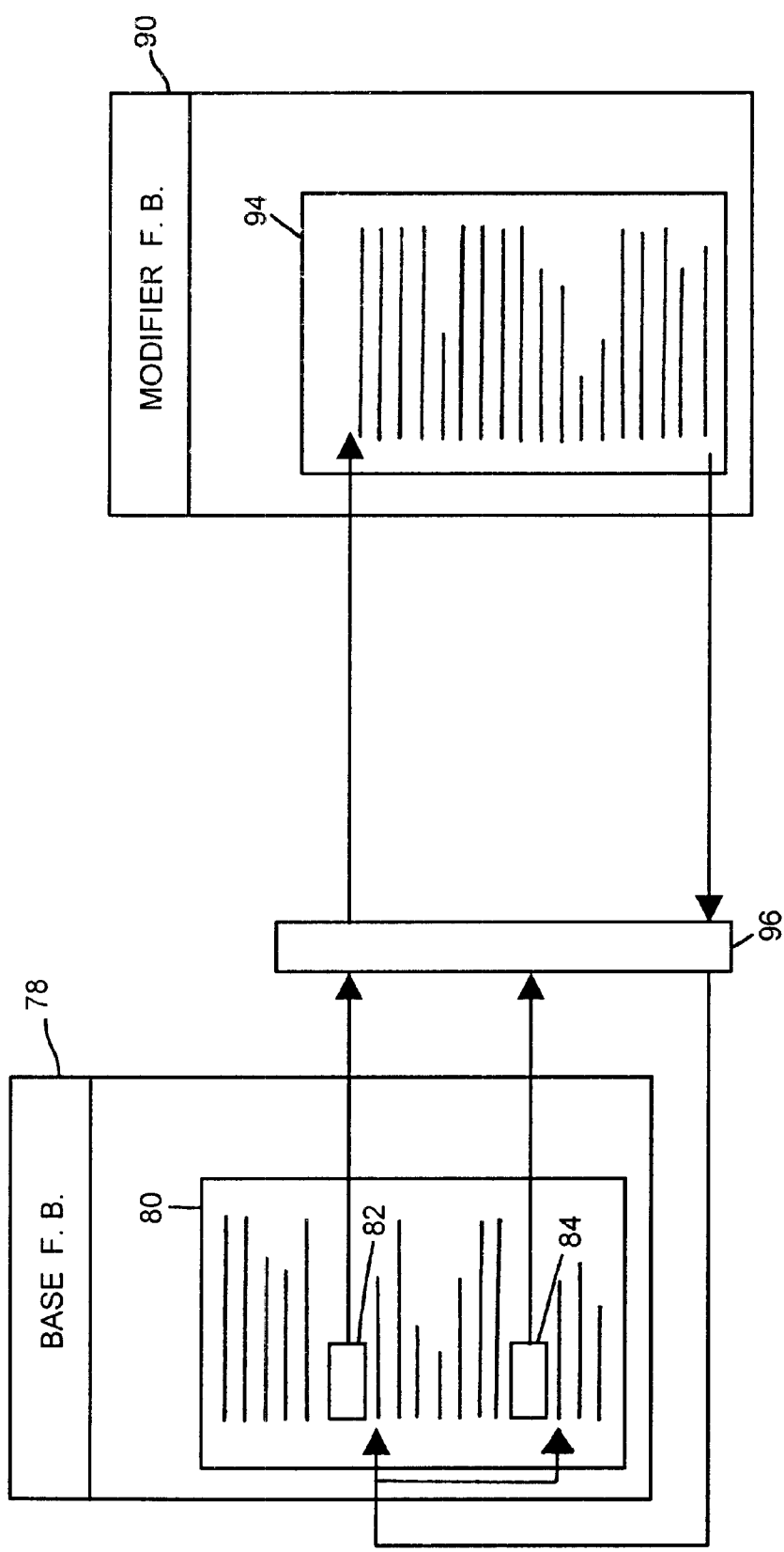
FIG. 5 is a schematic block diagram of an auto-tuning function block implemented as a modifier function block within a process control environment.

The concept of a modifier function block will be described in detail with respect to FIG. 5 depicting a base or original function block 78 which, in this example, may be the PID function block 62 of FIGS. 2, 3 and 4. As will be understood, the base or original function block 78 includes an algorithm 80 therein having lines of code or other types of code implemented by a processor. At one or multiple points within the code, illustrated in FIG. 5 as the points 82 and 84, a break or branching point is set within the algorithm 80. One or both of these branching points 82 and 84 may be used to provide enhanced capability within the algorithm 80, such enhanced capability being provided by a modifier function block 90 having an algorithm 94 therein.

Generally speaking, the branching points 82 and 84 along with any other desired branching points are set up in the base function block 78 when it is created. However, the contents of the branching point may be changed after compiling the base function block 78 to include a pointer either to the modifier function block 90 or to another line of code in the base algorithm 80. Initially, the pointer at the break point 82 is set to point to or to cause the algorithm 80 to continue with the next line of code within the algorithm 80 and, thus, operate without the enhanced capability. However, when some enhanced capability or functionality is desired to be added to the base function block 78, the pointer at one or more branching points (e.g., the point 82) is set to cause the algorithm 80 to call or otherwise transfer control to the algorithm 94 within the modifier function block 90 when the algorithm 80 reaches that branching point. If desired, the pointer 82 may store an address indicating the address of the modifier function block 90 in memory, or may be any other branching device or method used to pass control to the modifier function block 90.

When control is passed to the modifier function block 90, certain predefined data is sent to or made available to the modifier function block 90 which the modifier function block 90 uses or changes during operation of the algorithm 94. This data is provided through a fixed or predefined interface, illustrated in FIG. 5 as the interface 96. The interface 96 typically includes any of the parameter or data values required for use by the modifier function block 90 (or pointers thereto, such as addresses), where to return control within the base function block 78 and/or any other data or information needed by the modifier function block 90 to take control, execute, and return control to the base function block 78. When receiving control, the modifier function block 90 implements its algorithm 94 acting on the data provided via the interface 96 and, when complete, returns control to the point in the algorithm 80 of the base function block that immediately proceeds (in the execution sense) the break or branching point from which control was released. The modifier function block 90 returns certain data via the interface 96 (which may be the same or different interface. than that used to send control to the modifier function block 90) which data is used by the algorithm 80 in the base function block 78.

While two branching points 82 and 84 are illustrated in FIG. 5, one, three or any other number of branching points could be placed in the original function block 80 to provide for enhanced capability at one or more points in the algorithm 80. Furthermore, the branching points within the base function block 78 may be set to call different parts or subroutines of the algorithm 94 within the modifier function block 90 to thereby provide different enhanced functions at different parts of the base algorithm 80. This functionality may be necessary to implement an entirely new functionality, such as tuning, within the base function block 78, which may need to have different capabilities added at different points within the base algorithm 80. Of course, different branching points within the base algorithm 80 may be set up to call the same or different parts of a single modifier function block or may be set up to call different modifier function blocks.

When initially sold, the base function block 78 can be provided merely with branching points 82 and 84 (as well as any other desired branching points) which allow enhanced capability of modifier function blocks to be provided to the user at a later date. When the user does not need or want to implement the functionality associated with modifier function block(s), the user needs only to store a null value or some other indication at the branching points within the base algorithm 80 that the algorithm 80 should continue without calling a modifier function block. When a modifier function block capability is to be added, the values or pointers at one or more of the branching points within the base algorithm 80 are changed to cause the base algorithm 80 to call the appropriate modifier function block when the branching point is reached. Typically, this can be done without recompiling the base function block 78. Thereafter, the modifier function block 90 is called when the base algorithm 80 reaches the branching point. When called, the modifier function block 90 implements its algorithm 94 to enhance or change the functionality of the algorithm 80 within the base function block 78. However, when the enhanced or new functionality is no longer desired, such as at the end of a tuning procedure, the branching points can be reset to prevent the base function block 78 from calling the modifier function block 90.

In this manner, the base function block 78 can be initially sold without the upgraded capability, which reduces the documentation and overhead associated with that function block. However, the base function block 78 can be upgraded merely by adding an appropriate modifier function block 90 to the device in which the base function block 78 is stored and changing the pointers within the algorithm 80 of the base function block 78. This enables base function blocks to be enhanced or changed at a later date without having to implement a whole new base function block and without having to recompile the base function block 78, which makes upgrading the base function block 78 easier. Furthermore, different modifier function blocks can be developed for the same base function block which gives the user even more choices in terms of upgrading the system. This also enables function block providers to supply different versions or upgrades of a modifier function block with relative ease. Furthermore, the algorithm 80 of the base function block 78 does not have to be modified to provide additional capability where a block is designed to support a standard interface to modifier blocks. Likewise, support for added functionality is invoked only as is indicated by block attributes set during configuration or through a custom application such as the tuning application described herein. This results in reduced memory and CPU requirements when the features provided by a modifier function block are not required during normal operation of the process. As will be understood, when using modifier function blocks, the base function block remains the same except for the fact that it must be have the capability to call the modifier function block, i.e., having one or more resettable branching points therein.

When used in a Fieldbus environment, the modifier function block 90 (in this case, the auto-tuning function block 66) will execute in the same execution time frame as the base function block (e.g., the PID function block 62). Furthermore, the modifier function block 90 need not be visible to a user as a function block within the system because it is merely modifying the algorithm 80 of a base function block 78. If desired, however, the auto-tuner application user interface can obtain information from the modifier function block 90 using the well-known OPC protocol. Still further, it is easier to change the code of a base function block 78 by merely changing the code of the modifier function block 90, which can be added to and deleted from the system more easily than the base function block 78. This greatly speeds up the development of advanced control capabilities and means that a customer will only have to add overhead to the basic function block when that customer has a particular application which uses those features. That is, the customer can reduce the overhead of the system by not using and compiling the modifier function block when the added functionality provided by the modifier function block is not needed.

While the description hereof has been directed to the implementation and use of an auto-tuner having a single auto-tuning function block 66 and a single tuning controller 71, it will be understood that the auto-tuner can include a single or multiple tuning controllers 71 and/or multiple auto-tuning function blocks 66 located in different devices. Furthermore, it will be understood that a single auto-tuning function block 66 can be used to implement the dynamic data capture phase of multiple different control blocks within the same device and, as such, a device that has two or more control blocks still need have only one auto-tuning function block. Likewise, the same type of auto-tuning function block can be used with different types of control blocks (such as PI, PID and fuzzy logic control blocks) because the same dynamic data capture techniques can be used for loops having each of these different types of control elements. Auto-tuning function blocks can also be implemented using any external process control communication protocol (besides the Fieldbus protocol) and may be used to communicate with any type of function block including any function block that is similar to or the same as any of the different function blocks specifically identified by and supported by the Fieldbus protocol. Moreover, while the auto-tuning function block is described herein as a Fieldbus "function block," it is noted that the use of the expression "function block" herein is not limited to what the Fieldbus protocol identifies as a function block but, instead, includes any other type of block, program, hardware, firmware, etc., associated with any type of control system and/or communication protocol and that can be used to implement some control function. Thus, while function blocks typically take the form of objects within an object oriented programming environment, this need not be case and can, instead, be other logical units used to perform particular control (including input and output) functions within a process control environment.

Although the auto-tuning function block and tuning controller described herein are preferably implemented in software stored in, for example, a controller or other process control device, they may alternatively or additionally be implemented in hardware, firmware, etc., as desired. If implemented in software, the auto-tuning function block and tuning controller of the present invention may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the internet, etc.

Also, while the auto-tuner of the present invention is described in detail in conjunction with a process control network that implements process control functions in a decentralized or distributed manner using a set of Fieldbus devices, it will be understood that the auto-tuner of the present invention can be used with process control networks that perform control functions using other types of field devices and communication protocols, including protocols that rely on other than two-wire buses and protocols that support analog and/or digital communications. For example, the auto-tuner of the present invention can be used in any process control network that uses devices conforming to the HART, PROFIBUS, etc. communication protocols or any other communication protocol that now exists or that may be developed in the future.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An auto-tuner for use in a process control system having first and second devices communicatively coupled via a communication network and a control element located within the first device, the auto-tuner comprising:
   a first tuning element located in the first device including,
      a control element controller adapted to be communicatively coupled to the control element in the first device and to control the operation of the control element during a tuning procedure;
      a data collection unit that collects data generated during the tuning procedure; and
      a communicator that communicates process characteristic information to the second device via the communication network; and
   a second tuning element that is located in the second device and that is communicatively coupled to the first tuning element through the communication network, wherein the second tuning element determines a tuning parameter for the control element from the process characteristic information.

2. The auto-tuner of claim 1 wherein the first tuning element further includes a process characteristic calculator that calculates a process characteristic from the collected data and wherein the process characteristic information is indicative of the calculated process characteristic.

3. The auto-tuner of claim 1, wherein the process characteristic information comprises the collected data.

4. The auto-tuner of claim 1, wherein the second tuning element includes a set of rules used to determine a tuning parameter for a particular type of control element.

5. The auto-tuner of claim 4, wherein the set of rules is configured to determine a tuning parameter for a proportional-integral-derivative control element.

6. The auto-tuner of claim 4, wherein the set of rules is configured to determine a tuning parameter for a proportional-integral control element.

7. The auto-tuner of claim 4, wherein the set of rules is configured to determine a tuning parameter for a fuzzy logic control element.

8. The auto-tuner of claim 4, wherein the set of rules is configured to determine a tuning parameter using a neural network.

9. The auto-tuner of claim 1, wherein the second tuning element includes a plurality of sets of rules and wherein each of the plurality of sets of rules is configured to determine a tuning parameter for a different type of control element.

10. The auto-tuner of claim 1, wherein the first device is a Fieldbus device and the first tuning element is an auto-tuner function block that conforms to a Fieldbus protocol.

11. The auto-tuner of claim 1, wherein the second tuning element sends the determined tuning parameter to the control element.

12. The auto-tuner of claim 1, wherein the second tuning element is located in a centralized controller associated with the process control system.

13. The auto-tuner of claim 1, wherein the second tuning element is located in a user workstation associated with the process control system.

14. The auto-tuner of claim 1, wherein the first device is a field device.

15. The auto-tuner of claim 1, wherein the first tuning element is located in a first field device and the second tuning element is. located in a second field device.

16. The auto-tuner of claim 1, further including a third tuning element located in a third device, wherein the third device has a further control element therein, the third tuning element including,
- a second control element controller adapted to be communicatively coupled to the further control element in the third device and adapted to control the operation of the further control element during a further tuning procedure;
- a second data collection unit that collects data generated during the further tuning procedure; and
- a second communicator that communicates process characteristic information associated with the further control element to the second device via the communication network for use in determining a tuning parameter for the further control element.

17. An auto-tuner for use in implementing a tuning procedure in a process control system that has first and second devices communicatively coupled via a communication network, a processor capable of implementing software within each of the first and second devices, a memory in each of the first and second devices and a control element located within the first device, the auto-tuner comprising:
- tuning function block software adapted to be stored in the memory of the first device and implemented on the processor of the first device including,
  - a control routine that controls the operation of the control element within the first device during the tuning procedure,
  - a data collection routine that collects data generated during the tuning procedure and that stores the collected data in the memory of the first device, and
  - a communication routine that communicates process characteristic information to the second device via the communication network, and
- tuning parameter calculation software adapted to be stored in the memory of the second device and implemented on the processor of the second device that determines a tuning parameter for the control element of the first device from the process characteristic information.

18. The auto-tuner of claim 17, wherein the tuning function block software includes a process characteristic calculation routine that calculates a process characteristic from the collected data and wherein the process characteristic information is indicative of the calculated process characteristic.

19. The auto-tuner of claim 18, wherein the tuning parameter calculation software includes a set of rules used to determine the tuning parameter for a particular type of control element from the calculated process characteristic.

20. The auto-tuner of claim 19, wherein the set of rules is configured to determine a tuning parameter for a proportional-integral-derivative control element.

21. The auto-tuner of claim 19, wherein the set of rules is configured to determine a tuning parameter for a fuzzy logic control element.

22. The auto-tuner of claim 19, wherein the set of rules is configured to determine a tuning parameter using a neural network.

23. The auto-tuner of claim 18, wherein the first device is a Fieldbus field device and the tuning function block software is an auto-tuner function block that conforms to a Fieldbus protocol.

24. A method of tuning a control element located in a first device of a process control system having the first device and a second device communicatively coupled via a communication network, the method comprising the steps of:
- implementing a control procedure stored in the first device to control the operation of the control element and thereby to implement a tuning procedure;
- collecting data generated during the tuning procedure in the first device; communicating process characteristic information developed from the collected data to the second device via the communication network; and
- determining a tuning parameter for the control element from the process characteristic information in the second device.

25. The method of tuning a control element of claim 24, further including the step of determining a process characteristic from the collected data in the first device and wherein the process characteristic information is indicative of the determined process characteristic.

26. The method of tuning a control element of claim 24, wherein the process characteristic information comprises the collected data.

27. The method of tuning a control element of claim 24, wherein the step of determining a tuning parameter includes the steps of storing a set of rules for use in determining the tuning parameter for a particular type of control element in the second device and using the stored set of rules to determine the tuning parameter based on the process characteristic information.

28. The method of tuning a control element of claim 24, wherein the step of determining a tuning parameter includes the steps of storing a plurality of sets of rules, each of which is configured to determine a tuning parameter for a different type of control element and using different ones of the plurality of sets of rules depending on the type of control element being tuned.

29. The method of tuning a control element of claim 24, further including the step of sending the tuning parameter to the control element via the communication network after the step of determining the tuning parameter.

* * * * *

UNITED STATES PATENT AND TRADEMARK OFFICE
CERTIFICATE OF CORRECTION

PATENT NO. : 6,445,962 B1 Page 1 of 1
DATED : September 3, 2002
INVENTOR(S) : Terrence L. Blevins et al.

It is certified that error appears in the above-identified patent and that said Letters Patent is hereby corrected as shown below:

Column 2,
Line 13, please delete "simple.because" and insert -- simple because --.

Column 4,
Line 7, please delete "for example, PI, PID)" and insert -- for example, PI, PID --.

Column 6,
Line 37, please delete "which may.comprise" and insert -- which may comprise --.

Column 9,
Line 18, please delete "such as for example," and insert -- such as, for example, --.

Column 15,
Line 38, please delete "same or different interface.than that" and insert
-- same or different interface than that --.

Column 18,
Line 28, please delete "The auto-tuner of claim 1 wherein" and insert
-- The auto-tuner of claim 1, wherein --.

Column 19,
Line 3, please delete "tuning element is.located" and insert -- tuning element
is located --.

Signed and Sealed this

Seventeenth Day of February, 2004

JON W. DUDAS
*Acting Director of the United States Patent and Trademark Office*